Figure 1:
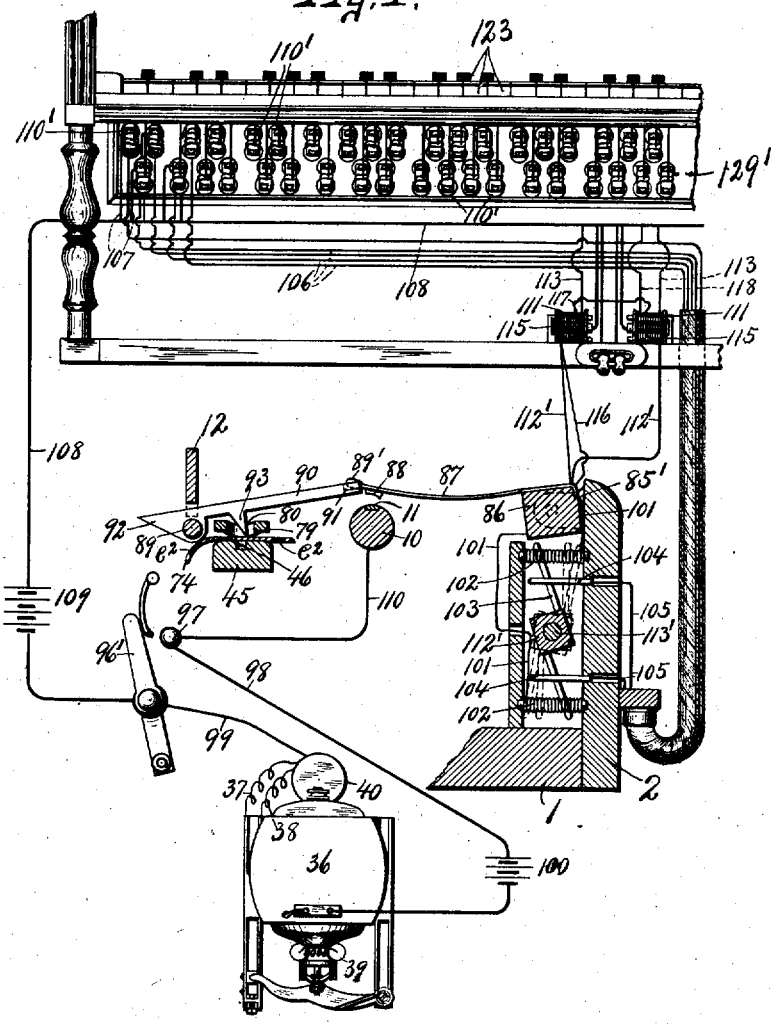

No. 12,845. REISSUED AUG. 25, 1908.

T. B. POWERS.

ELECTRIC PIANO PLAYER.

APPLICATION FILED OCT. 17, 1903.

7 SHEETS—SHEET 1.

Witnesses:

F. E. Arthur,

H. C. Chase

Inventor:

Timothy B. Powers

By

Howard P. Denison

Attorney.

No. 12,845. REISSUED AUG. 25, 1908.

T. B. POWERS.

ELECTRIC PIANO PLAYER.

APPLICATION FILED OCT. 17, 1903.

7 SHEETS—SHEET 2.

Witnesses:

F. C. Arthur,

H. B. Chase

Inventor:

Timothy B. Powers

By Howard P. Denison

Attorney.

No. 12,845. REISSUED AUG. 25, 1908.

T. B. POWERS.

ELECTRIC PIANO PLAYER.

APPLICATION FILED OCT. 17, 1903.

7 SHEETS—SHEET 3.

Witnesses:

F. E. Arthur,

C. C. Chase

Inventor:

Timothy B. Powers

By

Howard P. Denison

Attorney.

No. 12,845. REISSUED AUG. 25, 1908.
T. B. POWERS.
ELECTRIC PIANO PLAYER.
APPLICATION FILED OCT. 17, 1903.
7 SHEETS—SHEET 4.
Fig. 7.
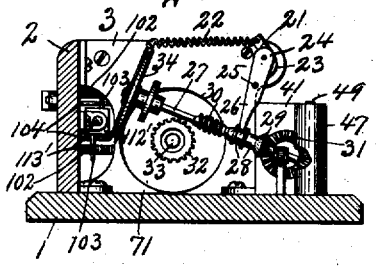
Fig. 9.
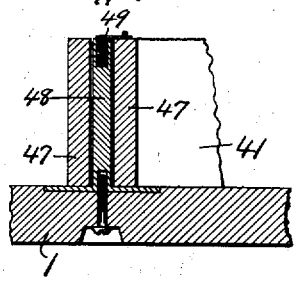
Fig. 8.
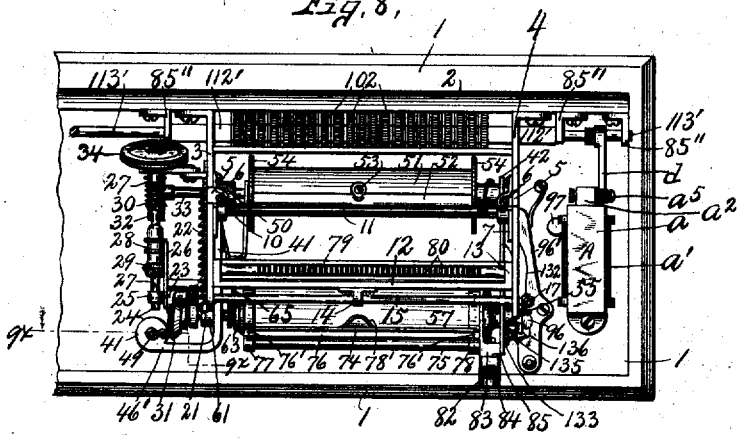
Fig. 10.
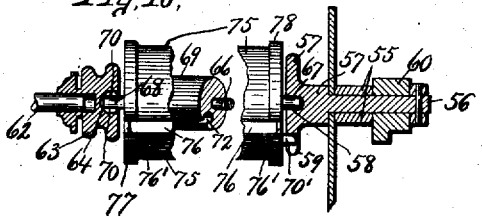
Fig. 11.
Witnesses:
F. E. Arthur,
H. C. Chase
Inventor:
Timothy B. Powers,
By
Howard P. Denison
Attorney.

No. 12,845.
REISSUED AUG. 25, 1908.
T. B. POWERS.
ELECTRIC PIANO PLAYER.
APPLICATION FILED OCT. 17, 1903.
7 SHEETS—SHEET 5.
Fig. 12.
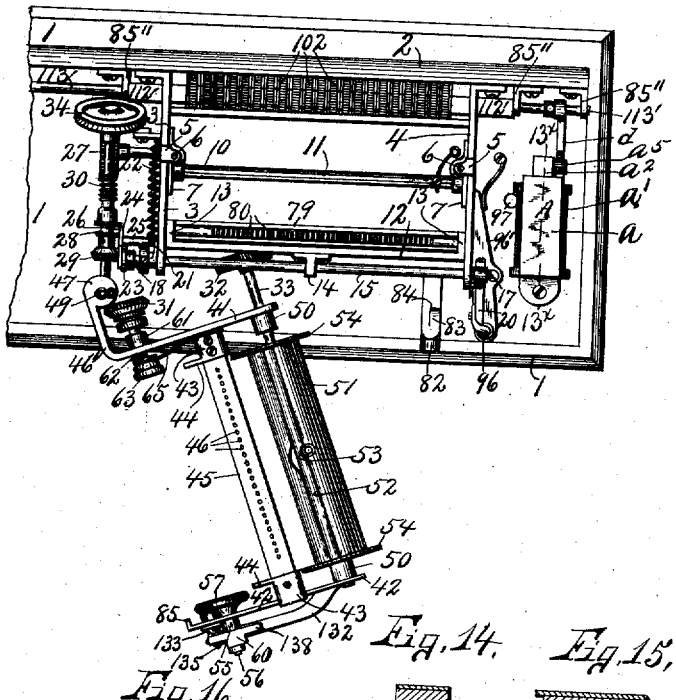
Fig. 14.
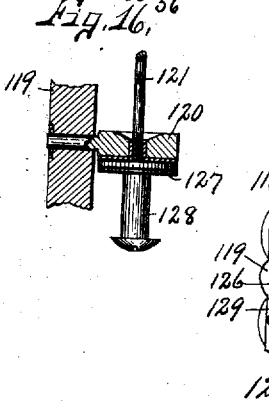
Fig. 15.
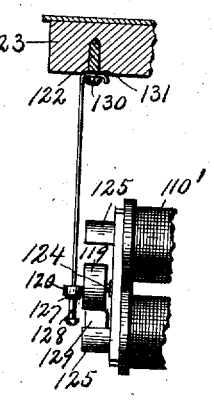
Fig. 16.
Fig. 13.
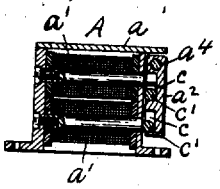
Witnesses:
F. E. Arthur,
H. C. Shaw
Inventor:
Timothy B. Powers
By
Howard P. Denison
Attorney.

No. 12,845.

REISSUED AUG. 25, 1908.

T. B. POWERS.

ELECTRIC PIANO PLAYER.

APPLICATION FILED OCT. 17, 1903.

7 SHEETS—SHEET 6.

Witnesses:

F. E. Arthur,

H. B. Chase

Inventor:

Timothy B. Powers.

By

Howard P. Denison

Attorney.

No. 12,845.

REISSUED AUG. 25, 1908.

T. B. POWERS.

ELECTRIC PIANO PLAYER.

APPLICATION FILED OCT. 17, 1903.

7 SHEETS—SHEET 7.

Witnesses:

F. E. Arthur,

H. B. Chase

Inventor:

Timothy B. Powers

By

Howard P. Denison

Attorney.

UNITED STATES PATENT OFFICE.

TIMOTHY B. POWERS, OF NEW YORK, N. Y., ASSIGNOR, BY MESNE ASSIGNMENTS, TO THE TELELECTRIC COMPANY, OF PITTSFIELD, MASSACHUSETTS, A CORPORATION OF MASSACHUSETTS.

ELECTRIC PIANO-PLAYER.

No. 12,845. Specification of Reissued Letters Patent. Reissued Aug. 25, 1908.

Original No. 681,730, dated September 3, 1901, Serial No. 23,200. Application for reissue filed October 17, 1903. Serial No. 177,507.

*To all whom it may concern:*

Be it known that I, TIMOTHY B. POWERS, a citizen of the United States, residing at New York city, in the county of New York and State of New York, have invented certain new and useful Improvements in Electric Piano-Players, fully described and represented in the following specification and accompanying drawings, forming a part of the same.

This invention has reference generally to improvements in that class of instruments or attachments for playing pianos, known as "electric piano-players," or for playing organs or other keyboard musical instruments; and the invention relates more particularly to a novel construction of attachment intended for use directly with the playing keys of the piano or other instrument to be actuated and controlled by means of an electric current, and a novel construction of controlling apparatus with which is used a perforated music sheet of a thin sheet metal, which is passed beneath a series of trailers when the apparatus is operated, and whereby by means of these several devices and the parts thereof, arranged in electrical systems of wiring connected with the key and pedal operating attachments in the piano, organ, or other keyboard musical instrument, the latter can be made to automatically produce any piece or composition of music.

The principal objects of this invention are, first, to produce a simple and efficient means for controlling a series of circuit closers or contact devices by means of a thin perforated piece of sheet metal, which is not sufficiently subject to expansion and contraction from heat and cold to distort the perforated sheet and which will not buckle in moist weather, as is the case with paper, and hence the perforations in the metal sheet will at all times and under the various conditions of the weather be in alinement with the proper levers or trailers. By the mechanical action obtained by the movement of points of such levers through the perforations corresponding contact devices will be actuated to close circuits and cause the proper keys to be operated, secondly, to provide means whereby a composition is produced in exact accordance with the intentions of a composer, not merely as to rhythm and melody, but also as to expression, as each and every single note can be reproduced either in its normal strength, "piano," "forte," or "fortissimo," as marked by the composer, or the "crescendo" and "decrescendo" can be suddenly or gradually produced by the automatic action of the various parts connected with the contact making and breaking apparatus. Besides these objects, hereinabove enumerated, there are others which will be more particularly referred to hereinafter.

My invention consists in the novel construction of controlling, or contact making and breaking, apparatus for the purposes hereinabove enumerated, as well as in the details of the construction of its parts, all of which will be hereinafter fully set forth.

My invention consists, further, in the organization of the following systems of apparatus and connecting electrical circuits and combining in one instrument all or any of the particular features for the particular purposes specified, all of which will be fully described in the following specification.

The invention is clearly illustrated in the accompanying drawings, in which similar numerals of reference are employed in the several views to indicate corresponding parts.

Figure 2:
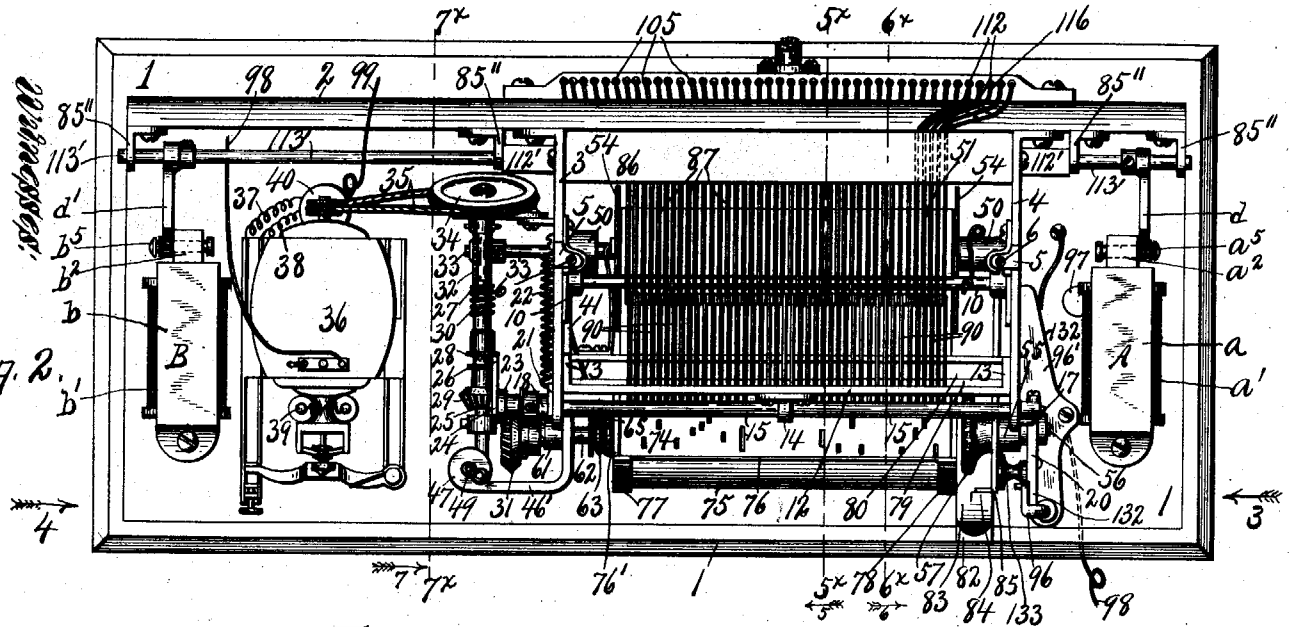
Figure 4:
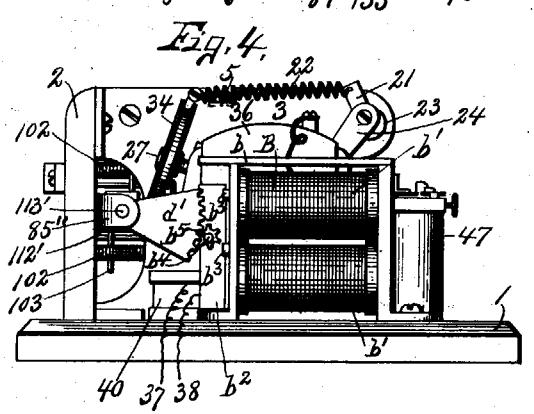
Figure 3:
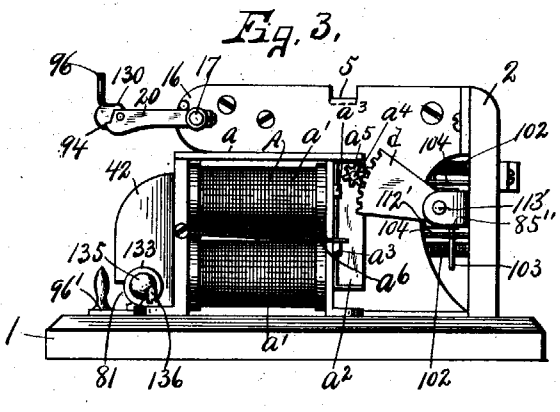
Figure 5:
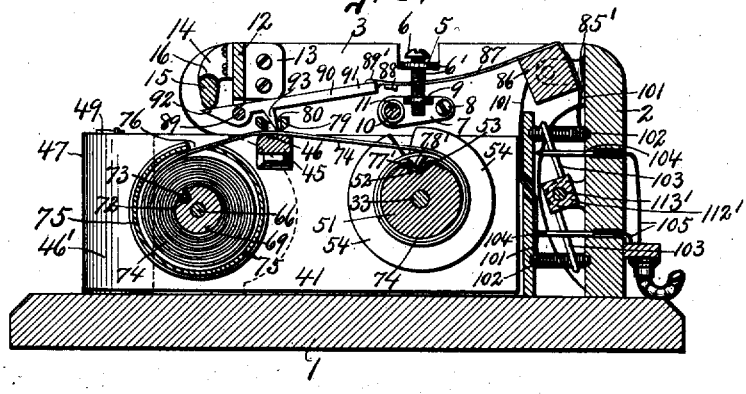
Figure 6:
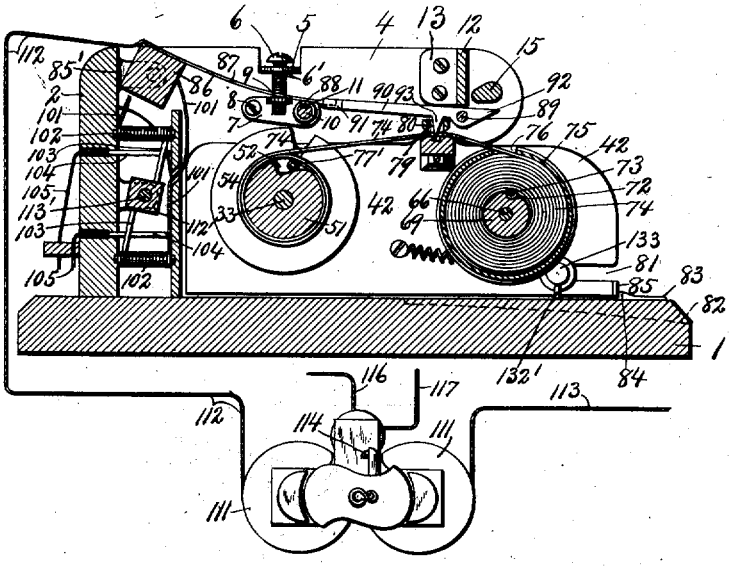
Figure 17:
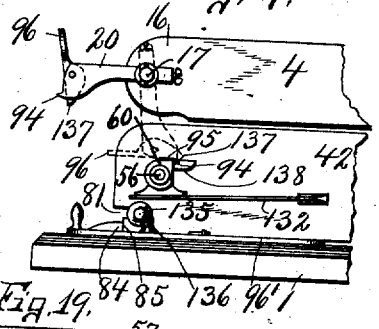
Figure 18:
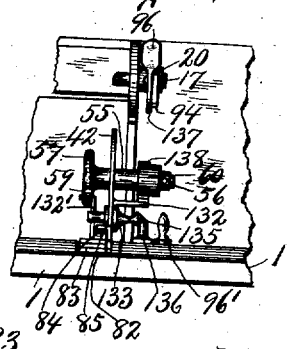
Figure 19:
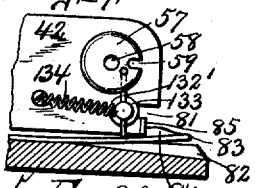
Figure 20:
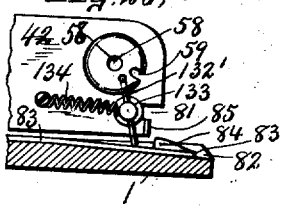
Figure 23:
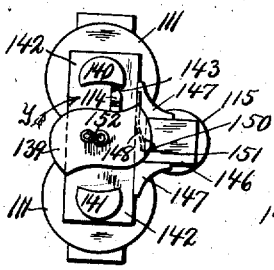
Figure 24:
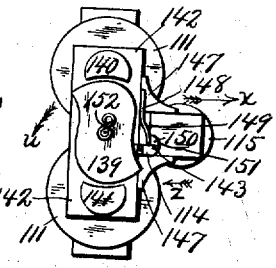
Figure 21:
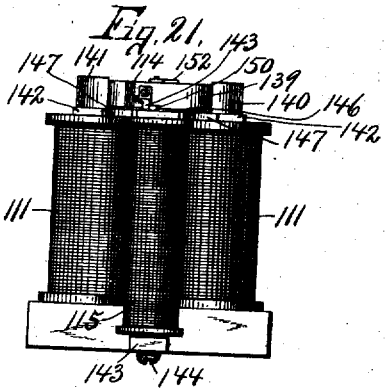
Figure 22:
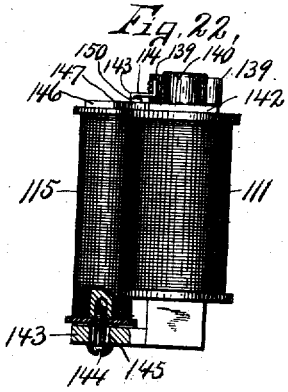
Figure 25:
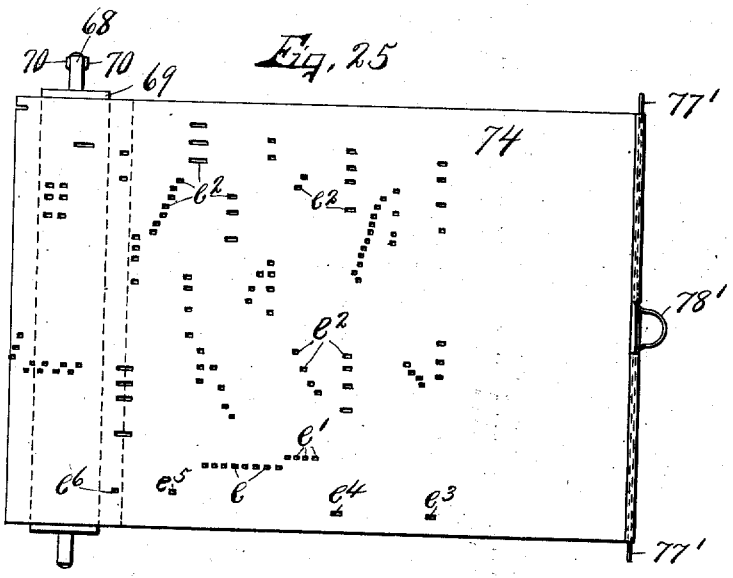
Figure 26:
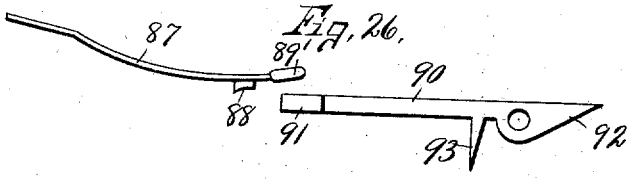
Figure 27:
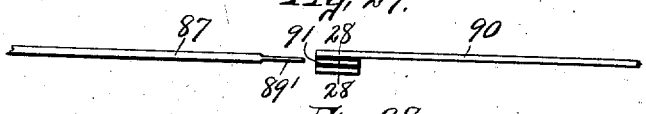
Figure 28:
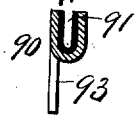

In said drawings, Figure 1 is a diagrammatic representation of the principal elements of my invention, illustrating one arrangement of the piano key actuating electromagnets and the pedal actuating electromagnets, the electrical circuits, and certain of the essential portions of the controlling, or contact making and breaking apparatus, the main controlling circuit, and the circuit and the electric motor therein for operating the winding and re-winding mechanism for the music sheet. Fig. 2 represents a general plan view of the controlling apparatus, the electric motor, and operative connections between said apparatus and the motor for producing the forward or backward rotary movement of the parts upon which the perforated sheet is reeled and unreeled, or vice versa. Fig. 3 is an end view of the apparatus looking in the direction of the arrow 3 in said Fig. 2, and Fig. 4 is a similar view of the other end of the apparatus looking in the direction of the arrow 4 in said Fig. 2. Fig. 5 is a vertical cross section of the apparatus on an enlarged scale, said section being taken on line $5^{\times}$ $5^{\times}$ in said Fig. 2 looking in the direction of the arrow 5; and Fig. 6 is a similar cross section taken on line 6× 6× in said Fig. 2, but looking in the direction of the arrow 6 in said figure. Fig. 7 is a vertical cross section of the apparatus, said section being taken on line 7× 7× in Fig. 2 looking in the direction of the arrow 7 in said figure. Fig. 8 is a plan or top view of the main portion of the said controlling apparatus with the perforated music sheet and the system of contact fingers removed; and Fig. 9 is a vertical section, on an enlarged scale, of a post and barrel connected with the carriage of the device and a communicating spring for swinging the carriage forwardly and outwardly when released, said section being taken on line 9× 9× in Fig. 8. Figs. 10 and 11 are views of the two end portions of the perforated music sheet holder or tube and two bearings connected with the frame of the carriage, both represented in vertical section. Fig. 12 is a plan view of the several parts represented in said Fig. 8, but the carriage being represented in its released position swung forwardly from the main frame of the apparatus in the position to receive the perforated music sheet containing holder or tube. Fig. 13 is a longitudinal vertical section of one of the rheostat controlling magnets, said section being taken on line 13× 13× in Fig. 12. Fig. 14 is an end view of the piano key operating electromagnets, illustrating in cross section one of the piano keys and a connecting rod between said key and the armature of the magnet. Fig. 15 is a vertical longitudinal section of a portion of the piano key and side view of a portion of the electromagnet, with its armature and connecting rod between said piano key and the armature. Fig. 16 is a vertical section, on an enlarged scale, of said armature and the lower end portion of the connecting rod operatively connected with a pivoted or oscillatory retaining collar secured to the armature, said Figs, 14, 15 and 16 being for the purpose of illustrating the preferred means of connection between the electromagnet and the piano key. Fig. 17 is a detail view of a portion of the main frame of the controlling apparatus and a portion of the frame of a swing carriage, representing in connection therewith and in side elevation a means for raising or lowering all contact making fingers simultaneously, and also a holding catch for retaining the carriage in its held and operative position in the main frame of the controlling apparatus or for releasing the carriage when a spring catch plate is actuated; and Fig. 18 is a front edge view of the parts represented in said Fig. 17. Figs. 19 and 20 are detail views of a portion of the carriage frame and portions of the releasing device represented in said Figs. 17 and 18, said views illustrating the carriage frame in its held and its released positions in the respective figures. Fig. 21 is a face view, and Fig. 22 a top view, of the form of pedal actuating electromagnet employed; and Figs. 23 and 24 are end views of said magnet, illustrating the armature of the magnet in its initial position in Fig. 23 when no current is passing through the magnetic coils, and Fig. 24 showing said armature in its position when attracted by the magnetic cores. Fig. 25 is a plan view of a perforated metal sheet for causing electrical contacts to be made. Fig. 26 is a side view of the two portions of the contact making fingers. Fig. 27 is a top view of the same, and Fig. 28 is a cross section taken on line 28 28 in Fig. 26.

In the said above described views the general construction of the controlling apparatus and contact making and breaking devices is such that electrical contact is not made through perforations in a sheet, as heretofore, but a perforated sheet is employed through which certain fingers are passed from time to time, whereby contact fingers are caused to be lowered and make electrical contact with a contact rod in the electric circuit in which the key actuating electromagnets and the pedal and rheostat actuating magnets are electrically connected.

The said controlling apparatus comprises a suitable base 1, preferably of wood, so as to be insulated from any body upon which it may be placed and provided at the back with an upright wall 2, from which extend the forwardly projecting side pieces 3 and 4 of the main frame of the same. The said side pieces 3 and 4 are provided with inwardly-extending portions 5, which are provided with screw holes for the reception of certain adjusting screws 6. These screws are held in their rotative positions by pins 6′, which extend on opposite sides of the screws and are arranged on the opposite sides of the portions 5 to prevent the upward and downward movements of the screws when turned. Pivotally secured upon the inner sides of the said pieces 3 and 4 by means of pins or screws 8 are suitable bars or plates 7, each plate or bar 7 being provided with a bearing portion 9, in which there is a screw hole for the reception of the lower screw threaded end of the screw 6 at each side of the framework of the apparatus. Connected at each end with the said plates or bars 7 is a contact support 10, which is provided upon its upper surface with a contacting rod 11 of suitable metal. From an inspection of Figs. 5 and 6 it will be seen that these bars or plates 7, owing to their pivotal arrangement and their connection with the threaded ends of the screws 6, are adjustable and the said contact support 10 can thus be raised or lowered for proper adjustment when found necessary.

At or near the front portion of each side piece 3 and 4 is a cross bar or plate 12, provided at its ends with ears or lugs 13, which extend at right angles therefrom and are provided with holes or perforations for screws by means of which the said rod is attached or secured in proper position between the said two side pieces 3 and 4. The said cross bar or plate 12 has secured upon its face or front surface a suitably constructed guide 14, which is provided with a downwardly projecting portion 16 the lower edge of which is made concave, substantially as illustrated, and in which concave portion the upper convex surface of a cam shaped rod 15 can oscillate and is held against upward displacement. This rod 15 is journaled in bearings or suitable holes in the two side pieces 3 and 4, which receive the respective cylindrical end portions 17 and 18 of the rod. The said cam-shaped portion of the rod 15 extends the entire distance between the inner surface of the two side pieces 3 and 4, and it has an oscillatory motion, being capable of setting the cams shaped portion 15 in the two positions indicated in said Figs. 5 and 6 when operated by means of an arm or lever 20 on the end 17 of the same, as shown more especially in Fig. 3. When the said arm or lever 20 is turned from the position indicated in Figs. 3 and 17 to the vertical position indicated in Fig. 8 or to the dotted position indicated in said Fig. 17 and to be held in such dotted position in the manner and for the purpose to be hereinafter more fully set forth, then the said cam shaped portion 15 will be moved from its vertical position (indicated in Fig. 5) to the horizontal position. (Indicated in Fig. 6.) At the same time the coils of a spring 22, which has one end secured to the outer side of the frame or side piece 3 and its other end attached to an arm 21 suitably secured upon the end 18 of the said rod 15, become distended. A suitably constructed cam disk 23, which is also secured upon the end portion 18 of the rod 15, causes the lower end portion 26 of a clutch lever 24, which is pivoted upon a post 25, to move in a direction toward the back of the apparatus. This rearward motion of the arm portion 26 causes a clutch collar or slide 28 to slide on a suitably placed shaft 27, and thereby disengages a bevel gear 29 from operative mesh with another bevel gear 31, and throws a worm 30 into operative mesh with a worm wheel 32 to rotate the main spindle 33 of the perforated sheet carrying carriage, to be presently described. The said shaft 27 is provided with a driving wheel 34, which is operated by means of a belt 35 or other driving means from an electric motor 36, placed in the main circuit wires 98 and 99, substantially as represented in Figs. 1 and 2. This motor may be provided with any well known construction of governor 39, and a rheostat device 40 is connected with the motor by the wires 37 and 38 for regulating its speed, and hence that of the rotating parts of the controlling apparatus, as will be clearly evident.

Having described the general construction of the base portion or main framework of the device, I will now set forth the construction of a swing carriage provided with suitable means for feeding a perforated sheet beneath those parts of the apparatus which make the electrical contacts and actuate the magnets in the piano or other instrument to produce the music.

As will be seen from an inspection more particularly of Fig. 12, the said carriage consists, essentially, of a pair of side frames 41 and 42, each of which is provided with a bracket 43, having a guide piece 44, and connected with said brackets 43 is a cross bar 45, of a non-conducting material, said bar being provided with suitably spaced depressions or holes 46, which correspond in number to the number of contact pieces employed in the apparatus. In order that the said carriage may be capable of a pivotal or swinging motion, the frame piece 41 has a forwardly extending portion provided with an arm 46, which projects at one side therefrom, as shown, and is secured to a tubular bearing 47. This bearing is made to swing on an upright 48, suitably secured in the proper place upon the base 1 of the apparatus, and a spring 49 is connected with said post 48 and the bearing 47 to actuate the carriage and cause it to swing in an outward direction, as illustrated in Fig. 12, and for the purposes set forth later on. Each side frame 41 and 42 of the carriage is also provided with a bearing 50, in which is rotatively arranged the main spindle 33 of the carriage and which is provided with the worm wheel 32, hereinabove mentioned. Upon this spindle 33 is secured a wooden or other suitable roller 51, which is preferably provided with a groove or depression 52 in its cylindrical surface and also has a centrally arranged hook 53, as clearly illustrated. At its ends the said roller is provided with flanges 54, which form guides between which the perforated sheet is properly reeled upon the said roller. The said side frame 42 is provided with a bearing 55, in which is rotatively arranged a stem 56. This stem is provided upon the inner side of said frame piece 42 with a bearing piece 57, provided with a central receiving depression 58 and a cut-away part 59 in its edge, while upon the outer end portion of said stem is suitably secured a catch plate 60. In the other frame piece 41 and in alinement with the bearing 55 of the frame piece 42 is a bearing 61, in which is rotatively arranged a spindle or stem 62, provided at its one end with the miter gear 31, hereinabove mentioned, and upon its inner end with a bearing portion 63. This bearing portion 63 has a centrally arranged bearing depression 64 and is held away from the inner surface of the frame piece 41 by a flat spring 65. Into the central bearing or receiving depressions 58 and 64 of the respective bearings 57 and 63 can be readily placed the respective ends 67 and 68 of a central rod 66, substantially as shown. This rod 66, which is provided with a central cylindrical body 69, upon which the perforated sheet is reeled, has its end 67 rotatively arranged in the recess 58 of the bearing 57; but its opposite end 68 is incapable of a rotative motion in the recessed portion 64 of the bearing 63, being prevented from turning therein by an arrangement of oppositely projecting extensions 70, which fit into slotted or grooved portions in said recess 64. Thus it will be evident that when the carriage is in its operative position in the main frame of the apparatus its worm gear 32 has been passed through an opening 71 in the frame piece 3, and when actuated by the engagement with the worm 30 on the motor driven shaft 27, as above set forth, then the roll or cylinder 51 is rotated, and the music sheet being attached thereto will be reeled upon the same, while it is unreeled from the cylindrical body 69, secured upon the central rod 66. The miter gear 31 at this time being out of operative engagement with the bevel gear 29, the bearing 63 will turn with the part 68 of the rod therein, and hence will not interfere with the unreeling of the music sheet from the cylindrical body 69. As illustrated in Figs. 5, 6, and 10, the said cylindrical body 69, which is secured upon the central rod 66, is provided with a longitudinally extending groove 72, which is quite narrow at its open portion in the cylindrical surface of the part 69. Into this groove is slipped from either end of the cylindrical body 69 a rod 73, to which has been previously attached the one end of a metallic and perforated sheet 74. This rod 73 is held in said groove 72, and the sheet is passed through the longitudinally arranged opening or mouth of said groove. The sheet is reeled or wound upon the said cylindrical body 69 and then incased in a metallic casing or shell 75, which has a longitudinally arranged opening 76 and is provided with the end pieces 77 and 78, each of which has a central perforation for arranging it upon the said central rod 66, substantially as illustrated. The end piece 78 is provided with a projection 70′, which is arranged in such a manner that when the shell (with the sheet 74) has been securely placed between the receiving or holding recesses of the bearings 57 and 63 of the carriage such projection 70′ will be arranged in the groove or cut-away portion 59 in the peripheral edge of the said bearing device 57. The said end pieces 77 and 78 are also provided with recesses 76′ in alinement with the opening 76, which recesses are for the purposes hereinafter more fully described. The perforated sheet is next pulled forward through the opening or slot 76 in the shell or casing 75 and its forward edge which is provided with a loop or ring 78′, formed on a bar or rod 77′. This ring or loop 78′ is hooked over a hook or button 53 upon the main roll 51 of the carriage. The said sheet 74 is to be wound or reeled upon the roll 51 when the shaft 33 is operated in the manner hereinabove set forth, and while being unreeled from the roll or cylindrical portion 69 the sheet 74 is made to pass over the cross bar 45, provided with the depressions or holes 46. When the carriage and its parts which have just been described are arranged between the two main frame pieces 3 and 4 of the apparatus, then said cross bar 45 is arranged directly beneath a cross guide 79, which is attached at its ends to the inner surfaces of the frame pieces 3 and 4 and has longitudinally extending openings 80. The sheet 74 will then pass directly beneath said guide 79 and over the cross bar 45, as represented in said Figs. 5 and 6. To hold the music sheet carrying carriage in its closed position between the two main frame pieces 3 and 4, I have provided the base 1 of the apparatus with a slotted or grooved portion 82, in which is a spring plate 83, which is capable of depression into said groove 82 by the frame piece 42 of the carriage, which thus can be readily passed over a holding lug or projection 84 on said spring plate 83. This lug as soon as the frame piece 42 has passed over it will assume the position indicated more especially in Figs. 17, 18 and 19 and acts as a stop to an edge 85 at the front of said frame piece 42, as shown, which prevents the spring 49 from forcing said frame forward until said stop has again been depressed and released from its holding engagement with the edge of the frame piece 42 to release the carriage and permit it to assume the position indicated in Fig. 12.

I will now describe the general arrangement of the electrical contact making and breaking fingers and the resistance devices employed with the apparatus in connection with the various electric circuits and the electromagnetic attachments connected with the piano keys and the pedals of a piano.

As will be seen from the several figures of the drawings, I have secured between suitable bearings or brackets 85, so as to be capable of a slight oscillation between said brackets, a bar 86. Suitably secured to said bar 86, as indicated, in Figs. 1 and 2, are the desired number of contact making or breaking fingers 87, preferably made of spring wire and each finger being preferably provided on its under surface with a contact piece or point 88, adapted to make electrical contact with the contact rod or bar 11 on the rod 10. Directly beneath the cross piece or bar 12, previously mentioned, is a rod 89, (see Figs. 1, 5 and 6,) on which I have secured a number of arms 90, which correspond in number to the number of contact fingers 87 and the number of playing keys and pedals in the musical instrument and the rheostat and release magnets which are to be actuated. Each arm 90 has a socketed or other similar end portion 91, as represented in Figs. 26, 27 and 28, in which is supported the end 89′ of a correspondingly placed contact finger 87, the same, however, being insulated from said support in any well-known manner. Each bar or arm 90 is also provided with a forwardly extending end portion 92, arranged directly beneath the cam shaped portion 15, which cam shaped portion when in the position indicated in Fig. 5 is brought in engagement with all the said end portions 92 of said arms 90, thereby causing a point or finger piece 93 on the lower edge of each arm 90 to be raised, as shown, and cause the remaining parts of the arms 90 to lift the contact points 88 on each contact finger 87 away from electrical contact with the part 11. Now suppose the music sheet 74 has been properly placed in the carriage in the manner hereinabove stated and that the carriage has been swung from the position indicated in Fig. 12 to the position represented in the other figures of the drawings, being held or locked in its operative position by the spring catch 83. The arm 20 on the end portion 17 of the cam shaped rod 15 is then turned into the dotted position indicated in Fig. 17, which causes the cam portion 15 to stand in the position indicated in Fig. 6. A nosing or hook portion 94 on said lever 20 has thus been brought in engagement with a sharp holding edge 95 of the catch plate 60, and these parts will thereby hold the said cam shaped portion 15 in its turned or raised position (indicated in Fig. 6) until a finger piece 96, which is pivotally secured to the said lever 20, is raised to release the parts in the manner and for the purposes hereinafter more fully set forth. By placing the cam shaped portion 15 in the said position in Fig. 6 the levers 90 and the contact fingers 87 have been allowed to assume their lower or operative positions, with the contact points of each finger 87 supported slightly above the contact bar or plate 11 on the contact support 10, but still out of electrical contact therewith. At the same time the motor has been placed in gear with the main shaft on which the roll 51 of the carriage is secured, and by closing the switch 96′ and making an electrical contact by means of said switch with a button 97 a complete circuit is established through the circuit wires 98 and 99 and a battery 100 or other electrical source, and the said motor will be operated. The motor thereupon causes the rotation of the shaft 33 and the operation of the various parts connected with the feed carriage. The perforated music sheet now passes beneath the points 93, which slide upon the upper surface of the said sheet, and when a perforation in said sheet passes beneath the point 93 of any one of the said arms or levers 90 then such point will extend into and through the perforation in the sheet 74 and down into the recess 46 in the cross bar 45 of the carriage. This action permits the contact 88 of the contact finger 87 to rest for the time being upon the contacting surface 11 of the support 10, and immediately a complete electric circuit is established through the said contact 88, resting upon the part 11, and through the respective contact finger 87, according to which one or more fingers have been actuated, thence by means of the wire or wires 101 through a resistance coil or coils 102, a movable arm or arms 103, and a rod or rods 104 through any one or more of the branch circuits 105 and 106, connected with the respective key actuating electromagnets or connected by means of other circuits hereinafter described with pedal actuating electromagnets or with rheostat actuating or with release magnets, the circuit being completed by means of the respective return wire or wires 107 with a main return 108 through electric battery 109 and the switch 96′ into the button 97 and the wire 110 back to the contact portion 11 of the bar 10.

The electromagnets for actuating the piano keys are indicated by the numeral 110′, and the pedal actuating electromagnets are indicated by the numeral 111.

The resistance device by means of which the current through the magnets 110′ can be intensified or decreased to cause the magnet to operate the piano key with a normal force or with an increased or decreased force, as may be desired, consists, essentially, of a vibratory rod or bar 112′, which is secured upon a bearing rod 113′, arranged in bearings 85″ and 85″, so as to be capable of oscillation in either direction. To cause the circuit completing rods or arms 103 to stand in the different positions and make various contacts with resistance coils 102, as indicated in the dotted outlines in Fig. 1, a pair of electromagnets A and B are employed, the armatures of which are actuated and controlled from separate circuits connected with separate contact fingers 87 when a point 93 of the respective lever or levers 90 passes through one or more of the perforations *e* and *e′* in the sheet 74. (Represented in Fig. 25.) It is due to the differently spaced perforations *e* and *e′* and the number of such perforations that the armatures of the respective magnets A and B are intermittently attracted, and thereby cause the arms or connecting bars 103 to make different electric contact with the resistance coils 102 and according to the position thereof to throw in circuit a greater or less resistance, whereby the tone to be played can be suitably varied, and the piece, which is automatically performed by the piano, is played in perfect imitation of the performance of a human player. These magnets A and B consist, essentially, of the frames $a$ and $b$ and the magnetic coils $a'$ and $b'$. The magnet A has a sliding armature $a^2$, which slides in ways or guides $a^3$ and is attracted in a downward direction when the current passes through the coils $a'$ and energizes the same. A spring $a^6$ retains said armature $a^2$ in its upward position (indicated in Fig. 3) when the current is shut off. On a rotatable spindle $a^4$ of the armature $a^2$ is a pinion $a^5$, which meshes with a toothed sector $d$, suitably connected with the rod 113′ for actuating said rod and causing the circuit completing arms 103 to move along the resistance coils 102, as above stated. The magnet B is provided with a sliding armature $b^2$, which moves in ways or guides $b^3$ and is attracted in an upward direction when the current is passed through the magnetic coils $b'$. The weight of the armature $b^2$ returns the same to its initial position (indicated in Fig. 4) when the current is shut off. On a rotatable spindle $b^4$ is a pinion $b^5$, which meshes with a toothed sector $d'$. This sector $d'$ is also suitably connected with the rod 113′ for actuating said rod and causing the circuit completing arms 103 to move along the resistance coils 102 in the opposite direction from that of the arms 103 when actuated from the magnet A. In order that the sliding armatures of the magnets A and B may move up or down with the least friction possible, each armature may be chambered, as at $c$, and may be provided with an antifriction roller $c'$, as indicated in Fig. 13.

From an inspection of Fig. 25 it will be seen that the perforations $e$ and $e'$ are arranged in such a manner that the respective trailer points 90 do not pass into and through any two perforations $e$ and $e'$ at the same time. Therefore the two electromagnets A and B are either entirely out of circuit or when the magnet A is in circuit then the magnet B is out of circuit, and, vice versa, when the magnet B is in circuit then the magnet A is out of circuit. The arrangement and construction of these magnets are such that the rods 103 are moved from the one extreme end of the resistances 102 to the other extreme end of said resistances or to any intermediate points between said ends, according to the length or number of perforations $e$ in the sheets 74 whereby the corresponding contact device is actuated and the electromagnet A is correspondingly energized, the said arms or rods 103 remaining in their subsequently moved positions against the resistances 102 when the magnet A is cut out of circuit. The said arms or rods 103 are returned or moved in the opposite directions against the resistances 102 from one extreme end to the other extreme end of the resistances or to any intermediate point between said ends by the electromagnet B when the same is placed in circuit by means of its correspondingly placed lever 90, permitting an electrical contact by entering one or more perforations $e'$ in the sheet 74.

In order that the mechanism of the magnets A and B may be operatively connected with the main spindle or stem 113′, the pinions $a^5$ and $b^5$ rotate loosely on their studs $a^4$ and $b^4$. When, however, the magnet A is energized by the electric current, then the pinion $a^5$ is attracted to one side of the armature $a^2$, where it is held in its fixed and non-rotatable position by magnetic attraction, and in consequence actuates the sector $d$ when the armature $a^2$ moves upwardly. During this time there being no current passing through the magnet B the pinion $b^5$ is free to rotate on its stud $b^4$, and hence does not block the movement of the sector $d'$ on the spindle or rod 113′. As soon as the magnet B is energized the reverse action takes place. The pinion $b^5$ becomes fixed in place by the magnetism in the magnet B and causes the actuation of the sector $d'$, and in this instance there being no current through the magnet A the pinion $a^5$ will rotate freely on its stud $a^4$, and hence does not block the movements of the sectors $d'$ and $d$, as will be clearly evident.

The contacts which are caused by the points on the levers or arms 90 passing through any one or more of the perforations $e^2$ in the sheet 74 cause the electromagnets 110′ to be actuated through the circuits, as stated, while each pedal magnet 111 is actuated through either of the circuit wires 112, connected with one or more of said contact fingers 87, and the return circuits 113 to the main return 108, substantially as illustrated in Fig. 1, when the point 93 of the respective lever or levers 90 extends into and through one of the perforations $e^3$ or $e^5$ in the sheet 74. These electromagnets 111 when thus actuated will maintain the loud or soft pedal, according to which has been worked, in constant action until the point 93 of the lever 90 drops into another perforation $e^4$ or $e^6$ in the sheet 74, when another circuit is established through auxiliary magnets 115, by means of the circuit wires 116, 117 and 118, with the main wire 108.

The arrangement and construction of the electromagnets 111, the auxiliary magnet 115, and their parts, as well as the workings of these parts, are as follows: When the electric current passes through the coils of the electromagnets 111 in the manner previously described, a rotary armature 139 will be caused to pass from its initial or normal position (indicated in Fig. 23) to the position represented in Fig. 24, owing to the magnetic attraction caused by the magnetized cores 140 and 141 of the electromagnets 111. The said armature has secured thereto a post 114, which is provided on its under surface and projecting in a direction toward the frame 142 of the electromagnets 111 with a short stud 143. The auxiliary electromagnet 115 is provided at one end with a screw 144, which is capable of a slight movement toward or away from the electromagnets 111 in a suitable slot 145 in the frame piece 143, as more particularly illustrated in Fig. 22 of the drawings. The opposite end 146 of the core of this electromagnet 115 is slidably arranged between a pair of guides 147, which extend from one side edge of the frame 142 in a direction toward the electromagnet 115. A spring 148 is secured to the side edge of the frame 142, the free end of said spring bearing directly against the surface 149 of the core 146, thereby forcing the auxiliary electromagnet 115 in the direction of the arrow $x$, as clearly indicated in said Fig. 24. The said core 146 is also provided with a suitable stop 150, which is preferably provided with a curved or rounded surface 151, substantially as shown. Now when the electric current passes through the electromagnets 111 the rotary armature 139 rotates in the direction of the arrow $y$ in Fig. 23. This rotary movement of the armature 139 causes the short stud 143 on the post 114 to ride upon and against the curved surface 151 of the stop 150, whereby the electromagnet 115 and its parts will move in the guides 147 toward the frame 142 in the direction of the arrow $z$ in Fig. 24. As soon as the stud 143 will have passed the stop 150 the spring 148 will again cause the electromagnet 115 to assume its first position. The electric current by this time has been interrupted and the electromagnets 111 have been cut out of circuit, thereby rendering them inactive; and a spring 152, connected with the rotary armature 139, tends to return said armature in the direction of arrow $u$ in Fig. 24 to its former position, (indicated in Fig. 23;) but the stud 143 is thereby brought against the back of the stop 150, as shown, and the return of the armature 139 in the direction of the arrow $u$ is prevented. In this manner the pedal of the piano or other musical instrument, which in the first instance has been electrically operated, is now mechanically held in such operated position. In order that the rotary armature 139 may be returned to its initial position by the spring 152 and the pedal placed out of action, electric current is now passed through the auxiliary magnet 115, whereby its core 146 becomes energized. This core 146, with the other parts of the electromagnet 115, in its endeavor to attract the fixed frame 142 is now drawn in the direction of arrow $z$ in Fig. 24 against the action of the spring 148 toward the said frame 142, as will be clearly understood. The stop 150 is thereby moved away from its holding engagement with the stud 143 of the post 114 and the spring 152 returns the rotary armature 139 to its initial position, (indicated in Fig. 23). This arrangement and construction of the several parts just described enables the use of but very short and slight electrical contacts, and in consequence a minimum consumption of electric current, at the same time holding the pedal in its operated position as long as desired without further consumption of electric current, except the small quantity of current required to energize the electromagnet 115 when the rotary armature 139 of the electromagnets 111 is to be released.

The electromagnet 110′, employed for actuating a piano key 123, is more clearly represented in Figs. 14, 15 and 16. Each magnet is provided with a peculiarly shaped armature 119, which is rotatively arranged on a pivot 124 between the extending end portions 125 of the cores of the magnet, by which it is attracted when magnetized by the passing electric current, and is returned to its initial position by a suitable spring 126, when the said cores are again demagnetized in the usual manner. The said pivoted armature 119 is provided with a pivotally arranged collar or ring shaped bearing 120, in which is secured, by means of a soft cushion 127 and an adjusting screw 128, the lower end of a rod 121, which is attached to the under side of the piano key 123 by means of a screw 122, substantially as illustrated. A soft felt or other suitable stop 129 is secured to the face of each electromagnet, which limits the return movement of the rotary or pivoted armature 119. The upper end of the link or rod 121 is preferably provided with a bent part 131, which is passed through a perforation 130 in the screw 122 and then slightly forced into the wood of the key 123 by the last turn of the screw. This manner of connecting these various parts permits of the proper oscillatory and pivotal motions of the same without deterioration to the proper action of the key.

The several electromagnets 110′, each one of which is independently connected with and arranged in circuit with a contact finger 87 and actuating lever 90, are preferably placed upon a support 129′, which is suitably secured to the piano frame in a position beneath the several piano keys, as indicated in Fig. 1. Thus each electromagnet 110′ will actuate the one piano key independently from the others by the electrical contact made on the contact bar 11 of the contact support 10 by any one of the contact fingers 87, due to the arrangement of the perforations in the metallic sheet 74. This sheet 74 being made of thin sheet metal, it can be easily wound and unwound upon the several rollers and cannot become distorted or buckled by moisture or heat, as is the case in musical instruments in which the perforated sheets used are of paper. When the metal sheet has been wound upon the roller 51 and nearly unreeled its entire length from the cylindrical body 69 and it is desired to rewind the sheet upon said body 69, all that is necessary is to force the lever 96 when in the dotted position indicated in said Fig. 17 in an upward direction, whereby its cam surface 137 will bear down upon a finger 138 on the piece 60, which is thereby partially rotated on the stem 56 against the upward pressure of a spring 132, the purpose of which is merely to retain said parts under normal conditions immovably in their operative positions, and the arm or lever can be turned back into its initial and upright position. The cam shaped portion 15 is now returned to its former position, (indicated in Fig. 5,) the several contact fingers 87 and levers 90 are raised, and the clutch sleeve 28 is caused to slide back on its shaft 27, thereby throwing the worm 30 out of mesh with the worm wheel 32 and causing the operative mesh of the miter pinion 29 with the bevel gear 31 on the stem 62. The direction of rotation of the rotatable parts in the carriage is thereby reversed, which causes the metal sheet 74 to be unreeled from the roller 51 and rewound upon its cylindrical body 69 until, finally, when the music sheet 74 is nearly rewound and its holding ring 78′ is automatically released from the hook 53, and just as the end of the sheet reaches the opening or slot 76 in the metal casing 75 the projections 77′, connected with the sheet 74, engage with the recesses 76′ in the ends of the case 75, and as the sheet 74 becomes taut within the case the case 75 is thus held in a fixed relation upon the body 69 and immediately tends to rotate with said body 69, and whereby the stud or projection 70′, which extends into the slot or cut-away portion 59 of the bearing device 57, as stated, causes a partial rotation of said bearing portion 57. This partial rotation actuates a rod or stem 132′, which is pivotally connected with said bearing portion, as shown in Figs. 19 and 20, and depresses the spring plate 83. The holding or catch portion 85 of said plate is thereby released from its holding engagement with the frame portion of the carriage, and the latter again swings in an outward direction to the position indicated in said Fig. 12, whereby the gear mechanism of these several parts is thrown out of engagement with the parts driven by the motor. The motor is immediately stopped by the outward movement of the carriage causing the electrical disconnection of switch 96′ from contact 97 and by breaking the circuit in thus shutting off the supply of current to the motor. As represented in Figs. 18, 19 and 20, the said stem 132′ is connected with a bearing device 133, which is slidably held between the edges of the cut-away portion 81 by a coiled spring 134, and said device is also provided with a suitably shaped stop 135, against which a post 136 on the switch lever 96′ is forced in frictional holding engagement to properly retain the end of said switch lever upon the contact button 97 while operating the apparatus. As soon as the carriage has been returned to the outward position (indicated in said Fig. 12) the shell or casing which contains the perforated sheet can be removed from the bearing devices 57 and 63 and another shell or casing, containing a differently perforated metallic sheet 74, arranged in position and the carriage returned to its operative position between the frame pieces 3 and 4 of the apparatus, as will be clearly evident.

The many advantages and the simplicity in the arrangement of the various parts are evident from the above description, and by the arrangement of the contact fingers and a resistance-coil in circuit with each contact finger any music, from the simplest air to the most complicated symphony and rhapsody, can be played by the instrument with precision and great feeling, the forte and pianissimo, as well as any crescendo or decrescendo passages as marked by the composer, being capable of exact reproduction. Furthermore, each piano key is actuated by its own electromagnet and branch current through an independent contact finger and cannot easily get out of order. It will also be evident that at no time will the attendance of an electrician be necessary after the various parts have once been arranged in position, and it is not necessary to have a piano or other instrument built exclusively for being worked by electricity, the attachments to the musical instrument being such that it can be made to perform automatically by means of my invention as herein set forth, or the keys can be operated in the ordinary manner by a person. The quantity of electricity required is exceedingly small and can be drawn from any suitable source of electricity, preferably a battery or batteries, as herein described.

Of course I am aware that changes may be made in the several arrangements and combinations of the various parts of mechanism and electrical connections, as well as in the details of the construction of such mechanism, without departing from the scope of my present invention. Hence I do not limit my invention to the exact arrangements and combinations of the several mechanisms, both mechanical and electrical, and the connecting electric circuits, as herein described, and illustrated in the accompanying drawings, nor do I confine myself to the exact details of the construction of any of the said parts.

Having thus described my invention, what I claim is.

1. In an instrument for playing pianos, organs, or other key board musical instruments, the combination, with electromagnets for operating the keys, of an electric circuit connected with each magnet, a source of electricity therefor, and a contact making and breaking apparatus comprising a contact support, and contact fingers, one in series with each electromagnet, and means connected with said apparatus for causing one or more of such contact fingers to make contact with said contact support, and complete the electric circuit through one or more of the electromagnets, and a series of resistance coils, one coil in each circuit between a contact finger and an electromagnet, and means for increasing or decreasing the resistance of said coils, consisting, essentially, of an oscillatory bar, and contact making rods or fingers thereon in sliding contact with said resistance coils, substantially as and for the purposes set forth.

2. In an instrument for playing pianos, organs, or other keyboard musical instruments, the combination, with electromagnets for operating the keys, of an electric circuit connected with each magnet, a source of electricity therefor, and a contact making and breaking apparatus comprising a contact support, and contact fingers, one in series with each electromagnet, and means connected with said apparatus for causing one or more of such contact fingers to make contact with said contact support, and complete the electric circuit through one or more of the electromagnets, and a series of resistance coils, one coil in each circuit between a contact finger and an electromagnet, and means for increasing or decreasing the resistance of said coils, consisting, essentially, of an oscillatory bar, and contact making rods or fingers thereon in sliding contact with said resistance coils, and means for causing an oscillatory motion of said bar comprising one or more electromagnets; and an independent circuit or circuits between said magnet or magnets to one or more of the contact fingers, substantially as and for the purposes set forth.

3. In an instrument for playing pianos, organs, or other keyboard musical instruments, the combination, with electromagnets for operating the keys, of an electric circuit connected with each magnet, a source of electricity therefor, and a contact making and breaking apparatus, comprising a contact support, a series of spring fingers adapted to make electrical contact with said contact support, said contact fingers being in series with said electromagnets, mechanism connected with said apparatus for causing one or more of such contact fingers to make contact with said contact support, and means for raising all of the contact fingers simultaneously away from contact with said contact support, and a series of resistance coils, one coil in each circuit between a contact finger and an electromagnet, and means for increasing or decreasing the resistance of said coils, consisting, essentially, of an oscillatory bar, and contact making rods or fingers thereon in sliding contact with said resistance coils, substantially as and for the purposes set forth.

4. In an instrument for playing pianos, organs, or other keyboard musical instruments, the combination, with electro magnets for operating the keys, of an electric circuit connected with each magnet, a source of electricity therefor, and a contact making and breaking apparatus, comprising a contact support, a series of spring fingers adapted to make electrical contact with said contact support, said contact fingers being in series with said electromagnets, mechanism connected with said apparatus for causing one or more of such contact fingers to make contact with said contact support, and means for raising all of the contact fingers simultaneously away from contact with said contact support, and a series of resistance coils, one coil in each circuit between a contact finger and an electromagnet, and means for increasing or decreasing the resistance of said coils, consisting, essentially, of an oscillatory bar, and contact making rods or fingers thereon in sliding contact with said resistance coils, and means for causing an oscillatory motion of said bar comprising one or more electromagnets, and an independent circuit or circuits between said magnet or magnets to one or more of the contact fingers, substantially as and for the purposes set forth.

5. In an instrument for playing pianos, organs, or other keyboard musical instruments, the combination, with electro magnets for operating the keys, of an electric circuit connected with each magnet, a source of electricity therefor, and a contact making and breaking apparatus, comprising a contact support, a series of spring fingers adapted to make electrical contact with said contact support, said contact fingers being in series with said electromagnets, mechanism connected with said apparatus for causing one or more of such contact fingers to make contact with said contact support, comprising a perforated sheet, and means for feeding said sheet, a cross bar 45 over which said sheet is passed, and provided with depressions or perforations, a guide bar directly above said cross bar, a series of pivoted levers 90, connected at one end with said contact fingers, but insulated therefrom, and a projection or finger on each lever 90 adapted to be passed through said guide bar and through a perforation in said perforated sheet and down into a depression in the bar 45, and cause the spring contact finger connected with said lever 90 to make electrical contact with said contact support, substantially as and for the purposes set forth.

6. In an instrument for playing pianos, organs or other keyboard musical instruments, the combination, with electro magnets for operating the keys, of an electric circuit connected with each magnet, a source of electricity therefor, and a contact making and breaking apparatus, comprising a contact support, a series of spring fingers adapted to make electrical contact with said contact support, said contact fingers being in series with said electromagnets, mechanism connected with said apparatus for causing one or more of such contact fingers to make contact with said contact support, comprising a perforated sheet, and means for feeding said sheet, a cross bar 45 over which said sheet is passed, and provided with depressions or perforations, a guide bar directly above said cross bar, a series of pivoted levers 90, connected at one end with said contact fingers, but insulated therefrom, and a projection or finger on each lever 90 adapted to be passed through said guide bar and through a perforation in said perforated sheet and down into a depression in the bar 45, and cause the spring contact finger connected with said lever 90 to make electrical contact with said contact support, and means for engagement with said levers 90 and raising all of the said contact fingers simultaneously away from contact with said fixed contact support, substantially as and for the purposes set forth.

7. In an instrument for playing pianos, organs or other keyboard musical instruments, the combination, with electro magnets for operating the keys, of an electric circuit connected with each magnet, a source of electricity therefor, and a contact making and breaking apparatus, comprising a contact support, a series of spring fingers adapted to make electrical contact with said contact support, said contact fingers being in series with said electromagnets, mechanism connected with said apparatus for causing one or more of such contact fingers to make contact with said contact support, comprising a perforated sheet, and means for feeding said sheet, a cross bar 45 over which said sheet is passed, and provided with depressions or perforations, a guide bar directly above said cross bar, a series of pivoted levers 90, connected at one end with said contact fingers, but insulated therefrom, and a projection or finger on each lever 90 adapted to be passed through said guide bar and through a perforation in said perforated sheet and down into a depression in the bar 45, and cause the spring contact finger connected with said lever 90 to make electrical contact with said contact support, and a series of resistance coils, one coil in each circuit between a contact finger and an electromagnet, substantially as and for the purposes set forth.

8. In an instrument for playing pianos, organs or other keyboard musical instruments, the combination, with electro magnets for operating the keys, of an electric circuit connected with each magnet, a source of electricity therefor, and a contact making and breaking apparatus, comprising a contact support, a series of spring fingers adapted to make electrical contact with said contact support, said contact fingers being in series with said electromagnets, mechanism connected with said apparatus for causing one or more of such contact fingers to make contact with said contact support, comprising a perforated sheet, and means for feeding said sheet, a cross bar 45 over which said sheet is passed, and provided with depressions or perforations, a guide bar directly above said cross bar, a series of pivoted levers 90, connected at one end with said contact fingers, but insulated therefrom, and a projection or finger on each lever 90 adapted to be passed through said guide bar and through a perforation in said perforated sheet and down into a depression in the bar 45, and cause the spring contact finger connected with said lever 90 to make electrical contact with said contact support, and means for engagement with said levers 90 and raising all of the said contact fingers simultaneously away from contact with said contact support, and a series of resistance coils, one coil in each circuit between a contact finger and an electromagnet, substantially as and for the purposes set forth.

9. In an instrument for playing pianos, organs, or other keyboard musical instruments, the combination, with electro magnets for operating the keys, of an electric circuit connected with each magnet, a source of electricity therefor, and a contact making and breaking apparatus, comprising a contact-support, a series of spring-fingers adapted to make electrical contact with said contact-support, said contact-fingers being in series with said electromagnets, mechanism connected with said apparatus for causing one or more of such contact-fingers to make contact with said contact-support, comprising a perforated sheet, and means for feeding said sheet, a cross-bar 45 over which said sheet is passed, and provided with depressions or perforations, a guide-bar directly above said cross-bar, a series of pivoted levers 90, connected at one end with said contact-fingers, but insulated therefrom, and a projection or finger on each lever 90 adapted to be passed through said guide-bar and through a perforation in said perforated sheet and down into a depression in the bar 45, and cause the spring contact-finger connected with said lever 90 to make electrical contact with said contact-support, and a series of resistance-coils, one coil in each circuit between a contact-finger and an electromagnet, means for increasing or decreasing the resistance of said coils, consisting, essentially, of an oscillatory bar, and contact-making rods or fingers thereon in sliding contact with said resistance-coils, one or more electromagnets for causing an oscillatory motion of said bar, and an independent circuit or circuits between said magnet or magnets to one or more of the contact-fingers, substantially as and for the purposes set forth.

10. In an instrument for playing pianos, organs, or other keyboard musical instruments, the combination, with electro magnets for operating the keys, of an electric circuit connected with each magnet, a source of electricity therefor, and a contact making and breaking apparatus, comprising a contact-support, a series of spring-fingers adapted to make electrical contact with said contact-support, said contact-fingers being in series with said electromagnets, mechanism connected with said apparatus for causing one or more of such contact-fingers to make contact with said contact-support, comprising a perforated sheet, and means for feeding said sheet, a cross-bar 45 over which said sheet is passed, and provided with depressions or perforations, a guide-bar directly above said cross-bar, a series of pivoted levers 90, connected at one end with said contact-fingers, but insulated therefrom, and a projection or finger on each lever 90 adapted to be passed through said guide-bar and through a perforation in said perforated sheet and down into a depression in the bar 45, and cause the spring contact-finger connected with said lever 90 to make electrical contact with said contact-support, and means for engagement with said levers 90 and raising all of the said contact-fingers simultaneously away from contact with said contact-support, and a series of resistance coils, one coil in each circuit between a contact-finger and an electromagnet, means for increasing or decreasing the resistance of said coils, consisting, essentially, of an oscillatory bar, and contact-making rods or fingers thereon in sliding contact with said resistance-coils, one or more electromagnets and connections for causing an oscillatory motion of said bar, and an independent circuit or circuits between said magnet or magnets to one or more of the contact-fingers, substantially as and for the purposes set forth.

11. In an instrument for playing pianos, organs, or other keyboard musical instruments, the combination, with electro magnets for operating the keys, of an electric circuit connected with each magnet, a source of electricity therefor, and a contact making and breaking apparatus, consisting, of a base and stationary frame-pieces, a contact-support in said frame-pieces, and contact-fingers, one in series with each electromagnet, a tubular bearing, an upright on said base extending into said bearing, a swing-carriage between said frame-pieces of the contact making and breaking apparatus, connected with said bearing, a spring between said bearing and the upright, said carriage being provided with a perforated sheet for causing the electrical contact of said contact-fingers with said contact-support, and completing the electric circuit through one or more of the electromagnets, substantially as and for the purposes set forth.

12. In an instrument for playing pianos, organs, or other keyboard musical instruments, the combination, with electro magnets for operating the keys, of an electric circuit connected with each magnet, a source of electricity therefor, and a contact making and breaking apparatus, consisting, of a base and stationary frame-pieces, a contact-support in said frame-pieces, and contact-fingers, one in series with each electromagnet, a tubular bearing, an upright on said base extending into said bearing, a swing-carriage between said frame-pieces of the contact-making and breaking apparatus, connected with said bearing, a spring between said bearing and the upright, said carriage being provided with a perforated sheet for causing the electrical contact of said contact-fingers with said contact-support, and completing the electric circuit through one or more of the electromagnets, and a series of resistance-coils, one coil in each circuit between a contact-finger and an electromagnet, substantially as and for the purposes set forth.

13. In an instrument for playing pianos, organs, or other keyboard musical instruments, the combination, with electro magnets for operating the keys, of an electric circuit connected with each magnet, a source of electricity therefor, and a contact making and breaking apparatus, consisting, of stationary frame-pieces, a contact-support in said frame-pieces, and contact-fingers, one in series with each electromagnet, a swing-carriage between said frame-pieces of the contact making and breaking apparatus, provided with a perforated sheet for causing the electrical contact of said contact-fingers with said contact-support, and completing the electric circuit through one or more of the electromagnets, and a series of resistance coils, one coil in each circuit between a contact-finger and an electromagnet, and means for increasing or decreasing the resistance of said coils, consisting, essentially of an oscillatory bar, and contact-making rods or fingers thereon in sliding contact with said resistance-coils, substantially as and for the purposes set forth.

14. In an instrument for playing pianos, organs, or other keyboard musical instruments, the combination, with electro magnets for operating the keys, of an electric circuit connected with each magnet, a source of electricity therefor, and a contact making and breaking apparatus, consisting, of stationary frame-pieces, a contact-support in said frame-pieces, and contact-fingers, one in series with each electromagnet, a swing-carriage between said frame-pieces of the contact making and breaking apparatus, provided with a perforated sheet for causing electrical contact of said contact-fingers with said contact-support, and completing the electric circuit through one or more of the electromagnets, and a series of resistance-coils, one coil in each circuit between a contact-finger and an electromagnet, and means for increasing or decreasing the resistance of said coils consisting, essentially, of an oscillatory bar, and contact-making rods or fingers thereon in sliding contact with said resistance-coils, and means for causing an oscillatory motion of said bar comprising one or more electromagnets and an independent circuit or circuits between said magnet or magnets and one or more of the contact-fingers, substantially as and for the purposes set forth.

15. In an instrument for playing pianos, organs, or other keyboard musical instruments, the combination, with electromagnets for operating the keys, of an electric circuit connected with each magnet, a source of electricity therefor, and a contact making and breaking apparatus, consisting of stationary frame-pieces, a contact-support in said frame-pieces, and contact-fingers, one in series with each electromagnet, a swing-carriage between said frame-pieces of the contact making and breaking apparatus, a perforated sheet in said carriage, means for feeding said sheet, a cross-bar 45 in said carriage, provided with depressions or perforations over which said sheet is passed, a guide bar directly over said cross-bar, a series of pivoted levers 90, connected at one end with said contact-fingers, but insulated therefrom, and a projection or finger on each lever 90 adapted to be passed through said guide-bar and through a perforation in the said sheet and in a depression in the bar 45, and thereby cause the spring-contact-fingers connected with said levers 90 to make electrical contact with said contact-support, substantially as and for the purposes set forth.

16. In an instrument for playing pianos, organs, or other keyboard musical instruments, the combination, with electro-magnets for operating the keys, of an electric circuit connected with each magnet, a source of electricity therefor, and a contact making and breaking apparatus, consisting of stationary frame-pieces, a contact-support in said frame-pieces, and contact-fingers, one in series with each electromagnet, a swing-carriage between said frame-pieces of the contact making and breaking apparatus, a perforated sheet in said carriage, means for feeding said sheet, a cross-bar 45 in said carriage, provided with depressions or perforations over which said sheet is passed, a guide-bar directly over said cross-bar, a series of pivoted levers 90, connected at one end with said contact-fingers, but insulated therefrom, and a projection or finger on each lever 90 adapted to be passed through said guide-bar and through a perforation in the said sheet and into a depression in the bar 45, and thereby cause the spring contact-fingers connected with said levers 90 to make electrical contact with said contact-support, and a series of resistance-coils, one coil in each circuit between a contact-finger and an electromagnet, substantially as and for the purposes set forth.

17. In an instrument for playing pianos, organs, or other keyboard musical instruments, the combination with electro-magnets for operating the keys, of an electric circuit connected with each magnet, a source of electricity therefor, and a contact making and breaking apparatus, consisting of stationary frame-pieces, a contact-support in said frame-pieces, and contact-fingers, one in series with each electro-magnet, a swing-carriage between said frame-pieces of the contact making and breaking apparatus, a perforated sheet in said carriage, a cross-bar provided with depressions or perforations over which said sheet is passed, a guide-bar directly over said cross-bar, a series of pivoted levers 90, connected at one end with said contact-fingers, but insulated therefrom, and a projection or finger on each lever 90 adapted to be passed through said guide-bar and through a perforation in the said sheet and into a depression in the bar 45, and thereby cause the spring contact-fingers connected with said levers 90 to make electrical contact with said contact-support, and a series of resistance-coils, one coil in each circuit between a contact-finger and an electro-magnet, and means for increasing or decreasing the resistance of said coils, consisting essentially of an oscillatory bar, and contact making rods or fingers thereon in sliding contact with said resistance-coils, substantially as and for the purposes set forth.

18. In an instrument for playing pianos, organs, or other keyboard musical instruments; the combination, with electro-magnets for operating the keys, of an electric circuit connected with each magnet, a source of electricity therefor, and a contact making and breaking apparatus, consisting of stationary frame-pieces, a contact support in said frame-pieces, and contact-fingers, one in series with each electro-magnet, a swing-carriage between said frame-pieces of the contact making and breaking apparatus, a perforated sheet in said carriage, a cross-bar provided with depressions or perforations over which said sheet is passed, a guide-bar directly over said cross-bar, a series of pivoted levers 90, connected at one end with said contact-fingers, but insulated therefrom, and a projection or finger on each lever 90 adapted to be passed through said guide-bar and through a perforation in the said sheet and into a depression in the bar 45, and thereby cause the spring contact-fingers connected with said levers 90 to make electrical contact with said contact-support, and a series of resistance-coils, one coil in each circuit between a contact-finger and an electro-magnet, and means for increasing or decreasing the resistance of said coils, consisting, essentially, of an oscillatory bar, and contact-making rods or fingers thereon in sliding contact with said resistance-coils, and means for causing an oscillatory motion of said bar comprising one or more electro-magnets, and an independent circuit or circuits between said magnet or magnets to one or more of the contact-fingers, substantially as and for the purposes set forth.

19. In an instrument for playing pianos, organs, or other keyboard musical instruments, the combination, with an electro-magnet or magnets for operating a key or keys, of an electric circuit connected with each magnet, a source of electricity therefor, and an electric contact making and breaking mechanism, fixed frame-pieces in which the same is arranged, a swing-carriage pivotally arranged in said frame-pieces, and a perforated music sheet in said carriage, constructed to cause said contact making and breaking mechanism to actuate the key magnet or magnets, substantially as and for the purposes set forth.

20. In an instrument for playing pianos, organs, or other keyboard musical instruments, the combination, with an electro magnet or magnets for operating a key or keys, of an electric circuit connected with each magnet, a source of electricity therefor, and an electric contact making and breaking mechanism, fixed frame pieces in which the same is arranged, a swing-carriage pivotally arranged in said frame-pieces, and a perforated music-sheet in said carriage, constructed to cause said contact making and breaking mechanism to actuate the key magnet or magnets, and a holding catch connected with said frame for locking or retaining said carriage in its operative position in said frame, substantially as and for the purposes set forth.

21. In an instrument for playing pianos, organs, or other keyboard musical instruments, the combination, with an electro magnet or magnets for operating a key or keys, of an electric circuit connected with each magnet, a source of electricity therefor, and an electric contact making and breaking mechanism, fixed frame-pieces in which the same is arranged, a swing-carriage pivotally arranged in said frame-pieces, and a perforated music-sheet in said carriage, constructed to cause said contact making and breaking mechanism to actuate the key magnet or magnets, and a holding catch connected with said frame for locking or retaining said carriage in its operative position in said frame, a driving-motor connected with said carriage for causing a feeding motion of the perforated sheet therein, and a reversing mechanism for reversing the direction of motion of said sheet and releasing said holding-catch and means connected with said frame and carriage causing said carriage to swing in an outward and forward direction, substantially as and for the purposes set forth.

22. The combination, in an instrument for playing pianos, organs, or other keyboard musical instruments, of a contact making and breaking device, comprising fixed frame-pieces, a bar 86 between said frame-pieces, said bar being capable of oscillation, contact making fingers extending from said bar, a support provided with a contact-bar with which said fingers are adapted to make electrical contact, and levers 90 in lifting engagement with said contact-making fingers, with a swing-carriage between said frame-pieces, a roller detachably arranged in bearings in said carriage, and a music-sheet on said roller constructed to actuate said levers 90 and cause said contact-making fingers to produce the electrical contact, a second roller upon which said sheet is to be reeled, a holding-catch for causing said carriage to be retained in its held and operative position in said fixed frame-pieces, and a motor for driving said second-roller, substantially as and for the purposes set forth.

23. The combination, in an instrument for playing pianos, organs, and other keyboard musical instruments, of a contact making and breaking device, comprising fixed frame-pieces, a bar 86 between said frame-pieces, said bar being capable of oscillation, contact-making fingers extending from said bar, a support provided with a contact-bar with which said fingers are adapted to make electrical contact, and levers 90 in lifting engagement with said contact-making fingers with a swing-carriage between said frame pieces, a roller detachably arranged in bearings in said carriage, and a music sheet on said roller constructed to actuate said levers 90 and cause said contact-making fingers to produce the electrical contact, a second roller upon which said sheet is reeled, a holding-catch for causing said carriage to be retained in its held and operative position in said fixed frame-pieces, and means connected with said detachable roller for rewinding the music-sheet thereon, substantially as set forth.

24. The combination, in an instrument for playing pianos, organs, or other keyboard musical instruments, of a contact making and breaking device, comprising fixed frame pieces, a bar 86 between said frame pieces, said bar being capable of oscillation, contact-making fingers extending from said bar, a support provided with a contact-bar with which said fingers are adapted to make electrical contact, and levers 90 in lifting engagement with said contact-making fingers, with a swing-carriage between said frame-pieces, a roller detachably arranged in bearings in said carriage, and a music sheet on said roller constructed to actuate said levers 90 and cause said contact-making fingers to produce the electrical contact, a second roller upon which said sheet is to be reeled, a holding-catch for causing said carriage to be retained in its held and operative position in said fixed frame-pieces, a motor for driving said second roller, means constructed and arranged for disconnecting said motor from said second roller and connecting said motor with the first roller, to reverse the direction of rotation of said rollers, and means connected with one of said frame-pieces adapted to be actuated by the music-sheet and thereby release the carriage from its held and operative position, substantially as and for the purposes set fort.

25. In an instrument for playing pianos, organs, or other keyboard musical instruments, the combination with electromagnets for operating the keys, of an electric circuit connected with each magnet, a source of electricity therefor, and a contact making and breaking apparatus, comprising, a slotted support, and a contact-bar in said slotted support, a series of levers 90 each provided at one end with a socketed end portion 91, carrying a piece of insulating material, a series of contact-fingers of equal number each having a portion 89′ extending into a socketed end portion 91, and resting in said insulating material, a contact-piece 88 on the under side of each contact-finger, and each contact-finger being in series with one electromagnet, and means connected with said apparatus for causing one or more of such levers to actuate said contact-finger or fingers and make contact with said contact-support and complete the electric circuit through one or more electromagnets, substantially as and for the purposes set forth.

26. In an instrument for playing pianos, organs, or other keyboard musical instruments, the combination with electromagnets for operating the keys, of an electric circuit connected with each magnet, a source of electricity therefor, and a contact making and breaking apparatus, a cam-shaped rod in said apparatus and means connected with said rod for raising and lowering its cam portion, a series of levers each carrying at one end a portion 92 bearing upon said cam-shaped rod and having at the other end a piece of insulating material, a series of electrical contact-making arms or fingers, each arm or finger having a portion resting on said insulating material, a series of resistance-coils, one coil in each circuit between a contact-finger and an electromagnet, and means in slidable contact with each coil for increasing or decreasing the resistance through said coil or coils, substantially as and for the purposes set forth.

27. In an instrument for playing pianos, organs, or other keyboard musical instruments, the combination, with a base, stationary frame-pieces on said base, and an upright on said base, of a spring-actuated swing-carriage pivoted on said upright, a music-sheet holder in said carriage, means for retaining said holder in operative position, and means for unwinding the music-sheet, substantially as and for the purposes set forth.

28. In an instrument for playing pianos, organs, or other keyboard musical instruments, the combination, with a base, stationary frame-pieces on said base, and an upright on said base, of a spring-actuated swing-carriage pivoted on said upright, a music-sheet holder in said carriage, means for retaining said holder in operative position, mechanism for rewinding the sheet, and means on said sheet for disengaging the sheet-holder from its operative position to permit said carriage to move in an outward and forward direction for removal of the music-sheet holder, substantially as and for the purposes set forth.

29. In an instrument for playing pianos, organs or other keyboard musical instruments, the combination with a series of key-operating electro magnets, of an electric circuit connected with each magnet, a circuit-closer in each of said circuits, means for operating said circuit closers, a resistance device in each of said circuits, means for increasing or decreasing the resistance of said resistance devices, and means for controlling said last mentioned means comprising one or more electro magnets, an independent circuit or circuits for said magnet or magnets, and a circuit closer in each of said last mentioned circuits.

30. In an instrument for playing pianos, organs, or other keyboard musical instruments, the combination with a series of key-operating electro magnets, of an electric circuit connected with each magnet, a circuit closer in each of said circuits, a series of trailers operatively connected with but insulated from said circuit closers, means for supporting and feeding a perforated music sheet in position to actuate said trailers, a resistance device in each of said circuits, means for increasing or decreasing the resistance of said resistance devices, and means for controlling said last mentioned means comprising one or more electro magnets, an independent circuit or circuits for said magnet or magnets, and a sheet-controlled circuit closer in each of said last mentioned circuits.

31. In an instrument for playing pianos, organs, or other keyboard musical instruments, the combination of a series of contact-fingers, a contact bar with which said fingers are adapted to make electrical contact, a series of levers in lifting engagement with said contact fingers, a carriage, means on the carriage for supporting and feeding a music sheet in position to actuate said levers to cause the contact fingers to engage the contact bar, said means including winding and rewinding rolls, means for holding the carriage in operative position, and means for automatically moving said holding means to release the carriage at the end of the rewinding movement of the music sheet, substantially as and for the purposes set forth.

32. In a controlling apparatus for an electrically-operated musical instrument, the combination of a series of contact fingers, a contact bar with which said fingers are adapted to make electrical contact, a series of levers in lifting engagement with but insulated from said contact fingers, and means for supporting and feeding a perforated music sheet in position to actuate said levers to cause the contact fingers to engage the contact bar, substantially as and for the purposes set forth.

33. In a controlling apparatus for an electrically operated musical instrument, the combination of a circuit closer, a support for a music sheet, and a trailer for coöperating with the music sheet and operatively connected with but insulated from the circuit closer, substantially as and for the purposes set forth.

34. In a controlling apparatus for an electrically operated musical instrument, the combination of a circuit closer, means for supporting and feeding a music sheet, and a trailer for coöperating with the music sheet and operatively connected with but insulated from the circuit closer, substantially as and for the purposes set forth.

35. In a controlling apparatus for an electrically operated musical instrument, the combination of a series of circuit closers for controlling a series of operating circuits, means for supporting and feeding a music sheet, and a series of trailers for coöperating with the music sheet and operatively connected with but insulated from the circuit closers, substantially as and for the purposes set forth.

36. In a controlling apparatus for an electrically operated musical instrument, the combination of a series of circuit closers for controlling a series of operating circuits, means for supporting and feeding a perforated music sheet, and a series of trailers for coöperating with the perforated music sheet and operatively connected with but insulated from the circuit closers, substantially as and for the purposes set forth.

37. In a controlling apparatus for an electrically operated musical instrument, the combination of a series of circuit closers for controlling a series of operating circuits, means for supporting and feeding a music sheet, and a series of trailers for coöperating with the music sheet for operating the circuit closers, said trailers being operatively connected with the circuit closers and insulated to prevent the passage of current between the circuit closers and the music sheet, substantially as and for the purposes set forth.

38. In a controlling apparatus for an electrically operated musical instrument, the combination with means for supporting and feeding a perforated music sheet, of the series of contact fingers 87, and the series of levers 90, each connected with but insulated from one of the contact fingers 87 and each provided with a point 93 for resting on and entering into the perforations in the music sheet, substantially as and for the purposes set forth.

39. A contact controller for an electrically operated musical instrument, comprising a non-covered sheet metal perforated music sheet, a trailer normally resting against the surface of said sheet in position to co-act with perforations therein, and a circuit closer controlled by said trailer and insulated therefrom, substantially as and for the purpose set forth.

40. In a controlling apparatus for an electrically operated musical instrument, the combination of a series of circuit closers, a non-covered sheet metal perforated music sheet, means for supporting and feeding the music sheet, and a series of trailers for co-acting with the music sheet and operatively connected with but insulated from the circuit closers, substantially as and for the purpose described.

41. In a controlling apparatus for an electrically operated musical instrument, the combination of a series of circuit closers, a non-covered sheet metal perforated music sheet, means for supporting and feeding the music sheet, and a series of trailers for co-acting with the music sheet to control the operation of the circuit closers, said trailers normally resting against the surface of the music sheet in position to co-act with the perforations therein, and the circuit closers being insulated from the music sheet, substantially as and for the purpose set forth.

42. In a controlling apparatus for an electrically operated musical instrument, the combination of a non-covered sheet metal perforated music sheet, means for supporting and feeding the music sheet, a series of trailers for co-acting with the music sheet, and a series of circuit closers insulated from the music sheet and controlled by said trailers, substantially as and for the purpose described.

43. In a controlling apparatus for an electrically operated musical instrument, the combination of a spring contact finger, a trailer having a bearing of insulating material for supporting the contact finger, and means for supporting a music sheet for co-acting with the trailer to cause the same to actuate the contact finger, substantially as and for the purposes set forth.

44. In a controlling apparatus for an electrically operated musical instrument, the combination of a series of spring contact-fingers, a series of trailers operatively connected with but insulated from the contact fingers, means for supporting and feeding a music sheet in position to co-act with the trailers to cause the same to actuate the contact fingers, and means for moving the trailers out of engagement with the music sheet, substantially as and for the purposes set forth.

45. In a controlling apparatus for an electrically operated musical instrument, the combination of a circuit closer, a music sheet, and means operatively connected with but insulated from the circuit closer for co-acting with the music sheet to control the circuit closer, substantially as and for the purposes set forth.

46. In a controlling apparatus for an electrically operated musical instrument, the combination of a series of circuit closers for controlling a series of operating circuits, means for supporting and feeding a perforated music sheet, and a series of trailers for co-acting with the music sheet and operatively connected with but insulated from the circuit closers, and means other than the music sheet for preventing the trailers from entering the perforation of the music sheet, substantially as and for the purposes set forth.

47. In a controlling apparatus for an electrically operated musical instrument, the combination with a series of operating circuits, means for supporting and feeding a music sheet, and a circuit closer in each of said circuits adapted to be controlled by the music sheet, of a resistance device in each of said circuits, a sheet controlled member, and means controlled by said member for simultaneously varying the resistance of a plurality of said resistance devices, substantially as and for the purposes set forth.

48. In a controlling apparatus for an electrically operated musical instrument, the combination of a series of electrically-operated operating devices, a series of circuits therefor, means for supporting and feeding a music sheet, a sheet controlled circuit closer in each of said circuits, a resistance device in each of said circuits, and electrically operated means controlled by the music sheet for varying the resistance of said resistance devices, substantially as and for the purpose set forth.

49. In a controlling apparatus for an electrically operated musical instrument, the combination of a series of electrically operated operating devices, a series of circuits therefor, a resistance device in each of said circuits, and electrically operated means for varying the resistance of said resistance devices, substantially as and for the purpose set forth.

50. In a controlling apparatus for an electrically operated musical instrument, the combination with a plurality of operating electric circuits, means for supporting and feeding a music sheet, and a sheet controlled circuit closer in each of said circuits, of a resistance device in each of said circuits, and means controlled by the music sheet for varying the resistance of said resistance devices from one extreme to the other and to a point or points intermediate the extremes, substantially as and for the purposes set forth.

51. In a controlling apparatus for an electrically operated musical instrument, the combination of a series of electrically operated operating devices, a series of circuits therefor, means for supporting and feeding a music sheet, a sheet controlled circuit-closer in each of said circuits, a resistance-device in each of said circuits, and electrically-operated means controlled by the music sheet and adapted to vary the resistance of said resistance devices from one extreme to the other and to a point or points intermediate the extremes, substantially as and for the purpose set forth.

52. In a controlling apparatus for an electrically operated musical instrument, the combination with a series of operating electric circuits, of a resistance device comprising a series of resistance coils and a series of contact members in contact with the coils, a coil and its contact member being in each of said circuits, means for supporting and feeding a music sheet, and electrically operated means controlled by the music sheet for causing a relative movement between the series of resistance coils and the series of contact members for varying the resistance in said circuits, substantially as and for the purposes set forth.

53. In a controlling apparatus for an electrically operated musical instrument, the combination of an electrically operated operating device, a circuit therefor, a resistance device in said circuit including a member movable for varying the resistance, electromagnets for operating said member in reverse directions, separate circuits to said magnets, means for supporting and feeding a music sheet, and a sheet controlled circuit closer in each of said magnet circuits, substantially as and for the purpose set forth.

54. In a controlling apparatus for an electrically operated keyboard musical instrument, the combination of a plurality of keys operating circuits, a resistance device in each of said circuits, electrically operated means for varying the resistance of said resistance device, an operating circuit therefor, means for supporting and feeding a music sheet, a sheet-controlled circuit closer in each of the key operating circuits, and a sheet controlled circuit closer in the resistance device operating circuit, substantially as and for the purposes set forth.

55. In a controlling apparatus for an electrically operated musical instrument, the combination with a series of circuit closers adapted to be controlled by a traveling music sheet, of mechanism for supporting a music sheet and for feeding the same in forward and reverse directions, said mechanism being movable into and out of operative position, and means controlled by the music sheet for causing said mechanism to move out of operative position when the music sheet has completed its reverse movement, substantially as and for the purposes set forth.

56. In a controlling apparatus for an electrically operated musical instrument, the combination with a series of circuit closers adapted to be controlled by a traveling music sheet, of a carriage movable into and out of operative position, winding and rewinding rollers for a music sheet mounted on the carriage, driving mechanism for actuating the rollers when the carriage is in operative position, a detent for holding the carriage in its operative position, and means controlled by the music sheet for tripping the detent to release the carriage at the end of the rewinding movement of the music sheet, substantially as and for the purposes set forth.

57. In a controlling apparatus for an electrically operated musical instrument, the combination with a series of circuit closers adapted to be controlled by a traveling music sheet, of a swinging carriage, winding and rewinding rollers for a music sheet mounted on the carriage, driving mechanism for the rollers, means tending to swing the carriage out of its operative position, a detent for holding the carriage in its operative position, and means actuated by the music sheet at the end of its rewinding movement for tripping the detent, substantially as and for the purposes set forth.

58. In an instrument for playing pianos, organs or other keyboard musical instruments, the combination of a series of circuit closers adapted to be controlled by a traveling music sheet, a carriage movable into and out of operative position, a music roll mounted in said carriage comprising a core or roller, a music sheet wound on the roller and a shell or casing in which said roller is rotatably mounted, the music sheet being provided at its outer end with means adapted to engage the shell or casing for turning the same when the sheet has been rewound by the rotation of the roller, means for drawing the sheet from the roll past said circuit closers, means on the carriage through which the core or roller of the music roll is rotated for rewinding the music sheet, driving mechanism for actuating said means when the carriage is in operative position, a detent for holding the carriage in its operative position, and means controlled by the turning of the shell or casing of the music roll for tripping the detent to release the carriage.

Witness my hand this 14 day of June, 1903.

TIMOTHY B. POWERS.

Witnesses:

CHAS. A. LIEB,

KATIE MCGUIRE.